United States Patent [19]

Mengshoel et al.

[11] Patent Number: 4,526,422

[45] Date of Patent: Jul. 2, 1985

[54] SITTING DEVICE

[76] Inventors: Hans C. Mengshoel, Gabels gate 41, N-Oslo 2; Svein A. Gusrud, Tokerudberget 18, N-Oslo 9, both of Norway

[21] Appl. No.: 452,923

[22] Filed: Dec. 27, 1982

Related U.S. Application Data

[63] Continuation of Ser. No. 143,466, Apr. 24, 1980.

[30] Foreign Application Priority Data

Apr. 30, 1979 [NO] Norway .............................. 791446

[51] Int. Cl.³ ............................................. A47C 15/00
[52] U.S. Cl. .................................. 297/243; 297/423; 297/445; 297/158; 105/344
[58] Field of Search ............... 297/423, 243, 232, 445, 297/452; 105/344, 345

[56] References Cited

U.S. PATENT DOCUMENTS

| | | | |
|---|---|---|---|
| 1,003,378 | 9/1911 | Sholes | 105/344 |
| 1,557,587 | 10/1925 | Hodgson | 105/345 |
| 3,350,133 | 10/1967 | Schaefer | 297/232 |
| 3,669,493 | 6/1972 | Vowles | 297/423 |
| 3,897,974 | 8/1975 | Barecki | 297/243 |
| 4,310,193 | 1/1982 | Kolleas | 297/423 |
| 4,328,991 | 5/1982 | Mengshoel et al. | 297/423 |

Primary Examiner—Francis K. Zugel
Attorney, Agent, or Firm—Darby & Darby

[57] ABSTRACT

A sitting device for freely chosen or fixedly attached mounting on a floor and on a subframe, or for attachment to vertical surfaces, said device comprising an array of supporting faces consisting of at least two such faces, neighboring supporting faces having different positions. One of the two neighboring supporting faces may serve to support the posterior of the occupant and the other to support the calf. Alternatively one serves to support the back and the other to support the posterior. The supporting faces comprise a forwardly inclined seat cushion and a calf cushion forming a mutual angle of at least 90°. The supporting faces may be arranged at a distance from each other and with free space between these. They may be mechanically linked with each other. A set of two posterior supports, a common calf support and a common table is provided.

11 Claims, 25 Drawing Figures

SITTING DEVICE

This is a continuation of application Ser. No. 143,466, filed Apr. 24, 1980.

The present invention relates to sitting devices for freely chosen positioning or fixedly attached mounting on a floor, or for attachment to vertical surfaces, as stated in the preamble of the claims hereinafter.

For a number of applications of sitting devices it is frequently impractical to use traditional chairs both with respect to cleaning and with respect to suitable sitting posture, e.g. in a work situation. There are a number of sitting devices which are fixedly attached to the floor, and such sitting devices are in particular found on ships, trains or vehicles. It is further known from such transportation means to have e.g. tip-up seats attached to a wall.

The present invention therefore aims at solving problems of the known sitting devices, and the characterizing features of the invention will appear from the claims hereinafter and the description below with reference to the drawings.

The present invention may find particular application as seats at tribunes, on public transportations in meeting rooms etc. The sitting device as shown in FIGS. 1 to 8 comprises a shin cushion 2 and a downwardly inclined seat 1 forming a mutual angle of 90° or more. The quite forwardly inclined seat provides the upper part of the occupant with a natural balanced posture (almost like standing) without the use of a support at the lumbar region and with a minimum use of muscular force. The posture prevents slipping at the lumbar region and the shin support of the sitting unit in front inhibits the forward sliding on the seat distributes part of the body weight from the seat to the shin support. By a sitting device it is here understood to mean sitting units as shown in FIGS. 1 to 8.

Figure 1:
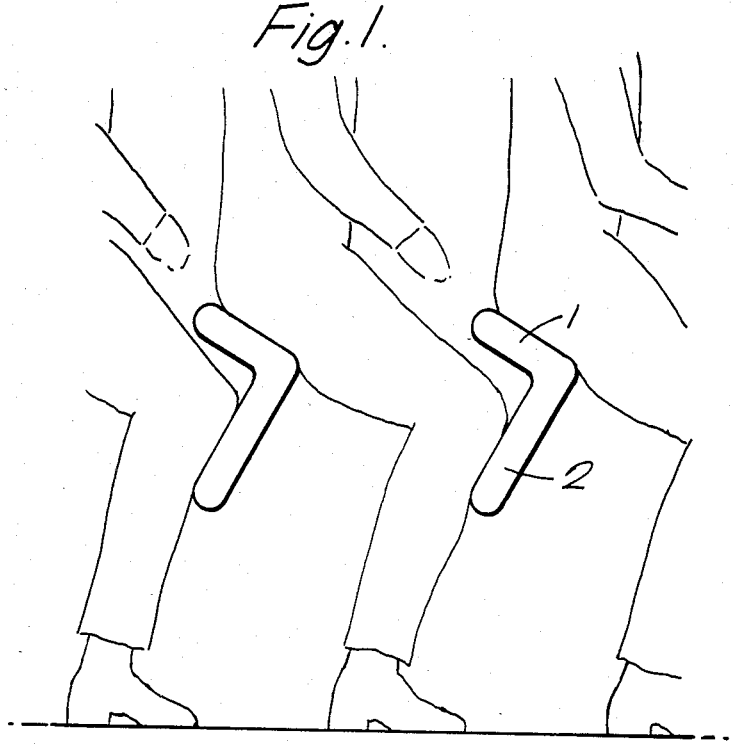
FIG. 1 depicts a sitting device attached to a vertical surface.
Figure 2:
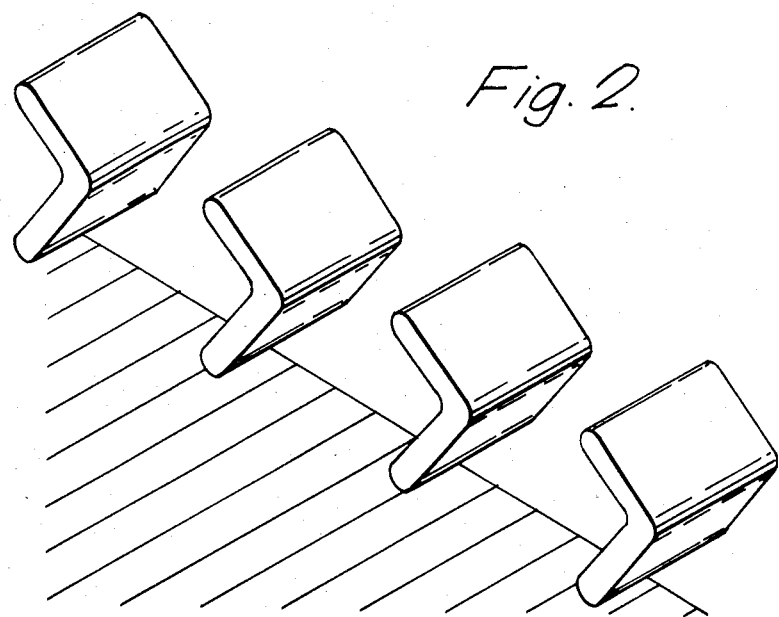
FIG. 2 depicts in a perspective view the sitting devices of FIG. 1.
Figure 3:
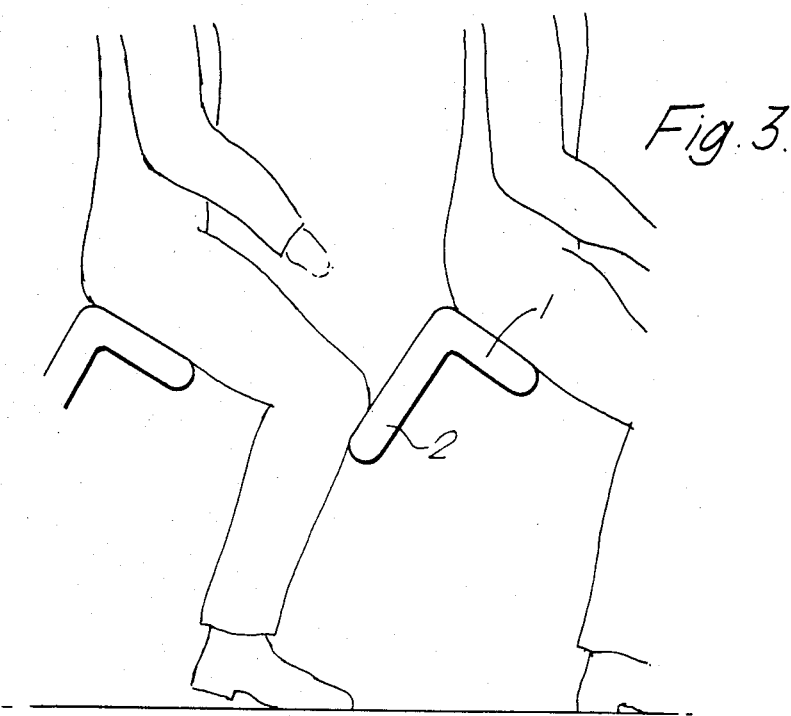
FIG. 3 depicts sitting devices according to the invention attached to a vertical surface and where the distance from a seat to the calf cushion in front is greater than what is shown in the FIGS. 1 and 2.
Figure 4:
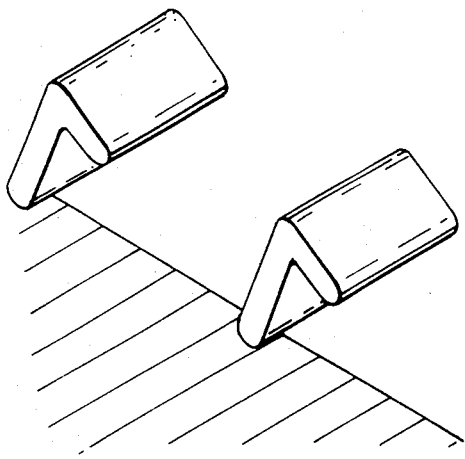
FIG. 4 depicts in a perspective view the devices according to FIG. 3.
Figure 5:
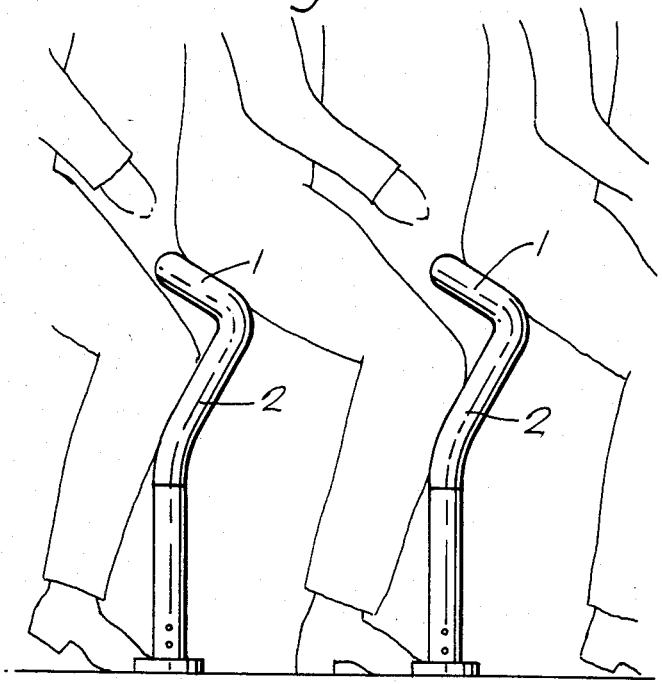
FIG. 5 depicts sitting devices according to the invention attached to a floor.
Figure 6:
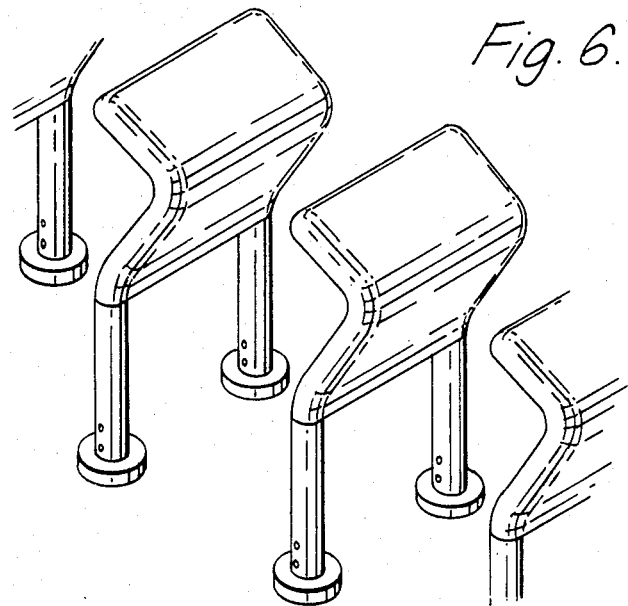
FIG. 6 depicts in a perspective view the embodiment of FIG. 5.
Figure 7:
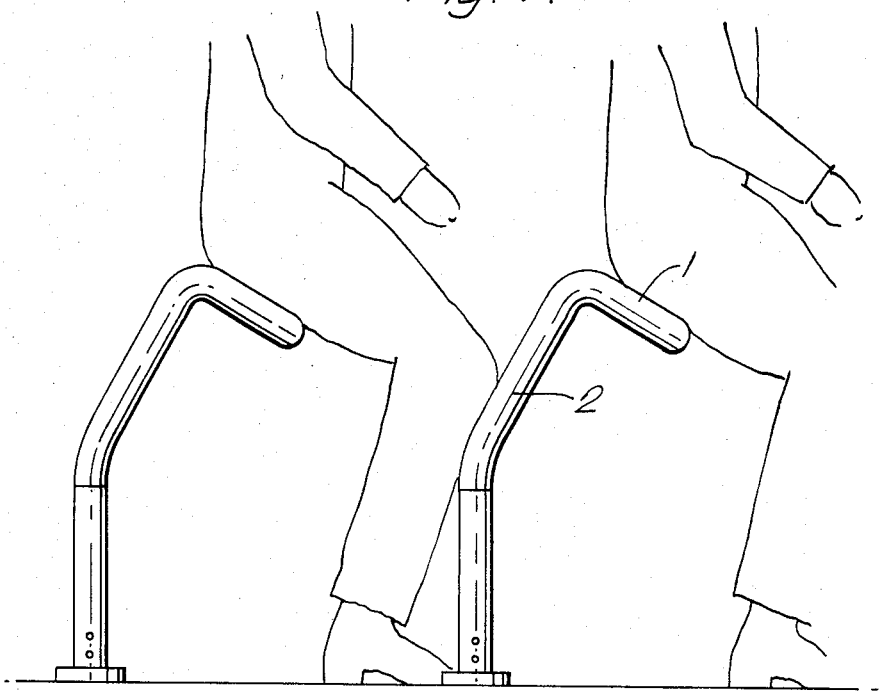
FIG. 7 depicts sitting devices attached to a floor where the distance from seat to calf cushion in front is greater than in FIGS. 5 and 6.
Figure 8:
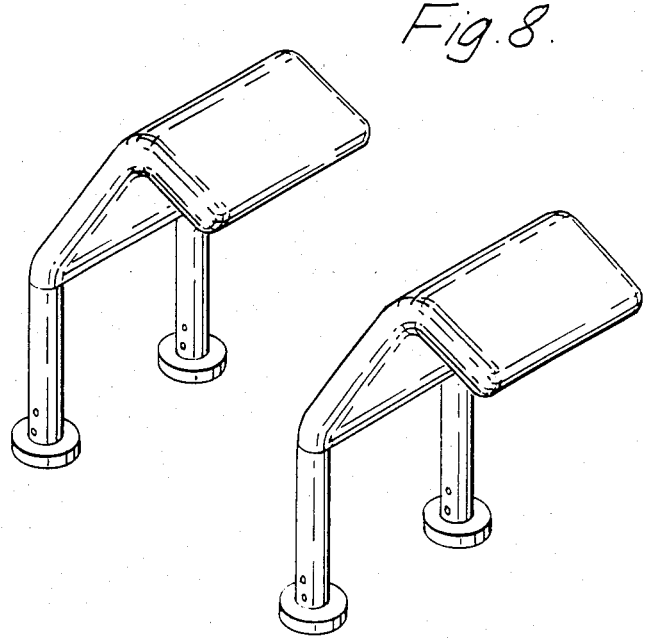
FIG. 8 depicts in a perspective view the devices according to FIG. 7.
Figure 9:
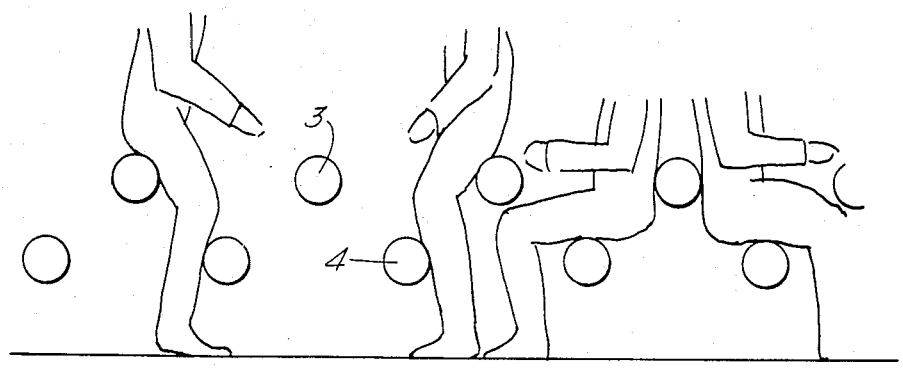
FIG. 9 depicts sitting devices in the form of sitting cushion projecting out from a vertical face.
Figure 10:
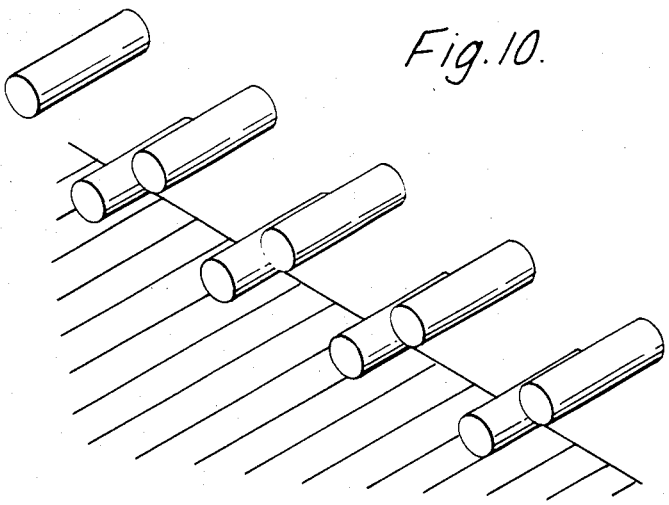
FIG. 10 depicts in a perspective view the embodiment of FIG. 9.
Figure 11:
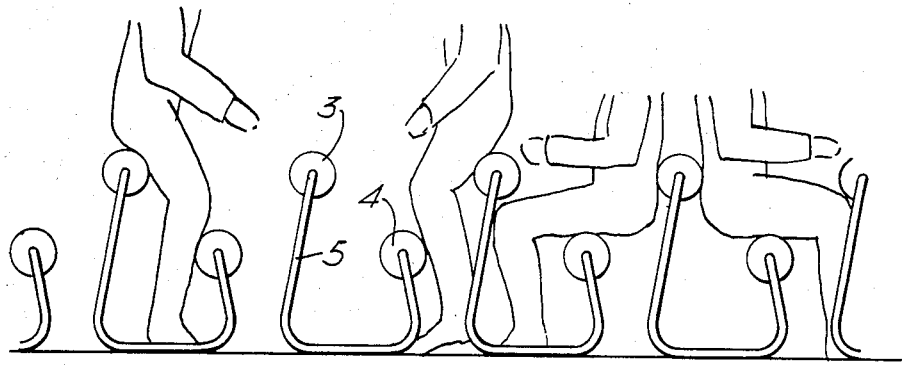
FIG. 11 is a modification of the embodiment of FIG. 9 where the sitting device has been arranged in a frame for a freely chosen positioning on a floor.
Figure 12:
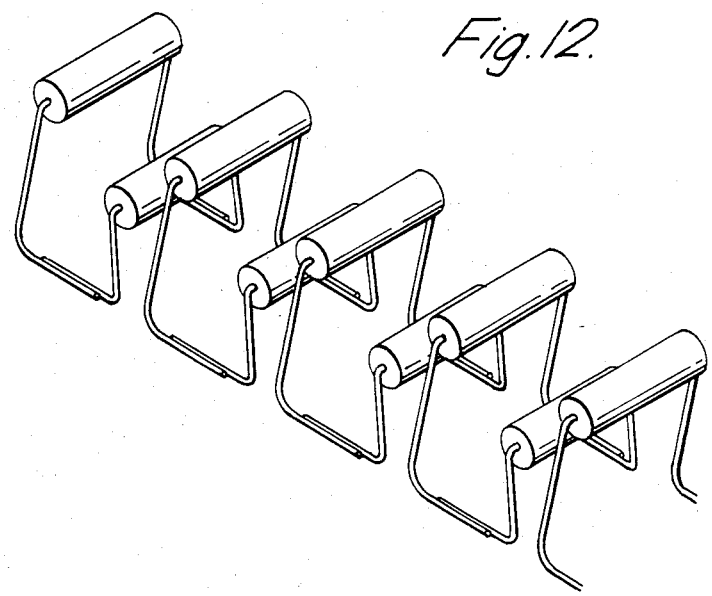
FIG. 12 depicts the embodiment of FIG. 11 in a perspective view.

By placing the same sitting units in an array after one another there is achieved the required sitting posture in that the shin cushion 2 of one sitting unit 1, 2 is used together with the seat 1 on the sitting unit behind, see FIGS. 1, 3, 5 and 7. The embodiments of the invention as shown thus provide an approximated standing-sitting posture with obtuse angles between the upper part of the body and leg and between the leg and the shin, respectively. As will appear from FIGS. 3, 4 and 7, 8 one may, by shifting the shin support of each sitting unit rearwardly easily alter the mutual distance between the sitting units. Sitting units attached e.g. to a wall will ease the cleaning of the floor compared with sitting equipment dependent on standing on a floor. By positioning the sitting units in an array after one another, such that the user assumes an approximately standing-sitting posture, the invention will provide the possibility of seating substantially more people per square meter than would be allowed with existing traditional sitting equipments in the previously-mentioned fields of use. Due to the approximated standing-sitting posture with open angles between the upper part of the body and the leg, and between the leg and the calf, there will be required less muscular force in order to sit down and rise from the sitting units than, compared with existing sitting equipments having a lower sitting level. An important advantage is also that the access to the sitting unit is simple. Used in connection with tribunes, such sitting unit may prevent avalanche effects, i.e. that the rearmost rows of spectators upon a forward fall do not cause the rows of spectators in front to be involved in the fall. In FIGS. 9-12 there are shown modifications of the embodiments of FIGS. 1-8. The sitting units are here each replaced by two-part supports 3, 4, e.g. in the form of padded cushions having cylindrical form or other suitable cross-section. As shown in FIG. 9 these supporting points may serve the same function as the sitting units of FIGS. 1-8 and as shown to the right of FIG. 9 these supporting points may alternatively form lumbar and posterior region supports. FIGS. 11 and 12 illustrate a modification of the embodiment of FIGS. 9 and 10, where the supporting parts 3, 4 are arranged on sub-frame 5 to be placed freely on a floor. These supporting parts may of course be arranged at different levels from the floor and according to a preferred embodiment they are arranged at the same mutual distance in the horizontal plane. As will appear from FIGS. 9 and 11 one may sit both ways. As shown in FIG. 12 the subframe for the upper supporting cushion may be connected to the subframe of the lower supporting cushion. By a suitable design of said interconnection, the shown sitting devices of FIGS. 11 and 12 may be stacked.

The sitting devices shown are easy to enter and to move out of and in reality one may, as regards the embodiments of FIGS. 5 to 8 and 11 to 12, walk right through the sitting device.

Figure 13:
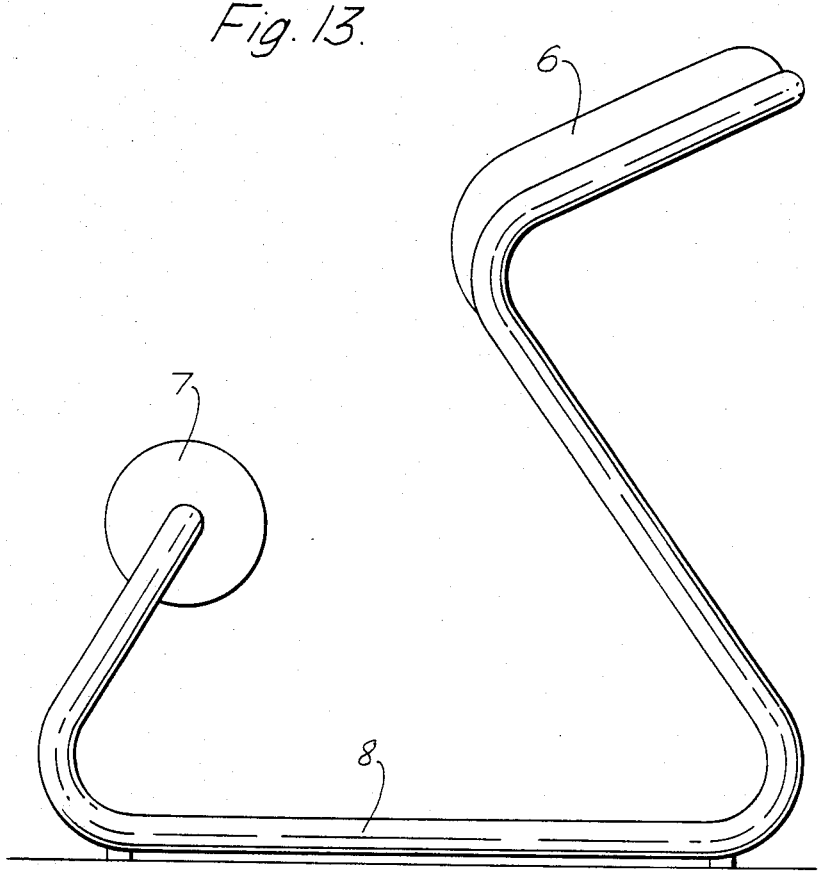
FIG. 13 depicts a modified embodiment of the sitting device in FIGS. 11 and 12.

In FIG. 13 there is shown a seat member 6, a shin support 7 of cylindrical form, both mounted to a common frame 8. The application is specifically shown in FIGS. 18 and 19 where the sitting devices are placed in an array.

Figure 14:
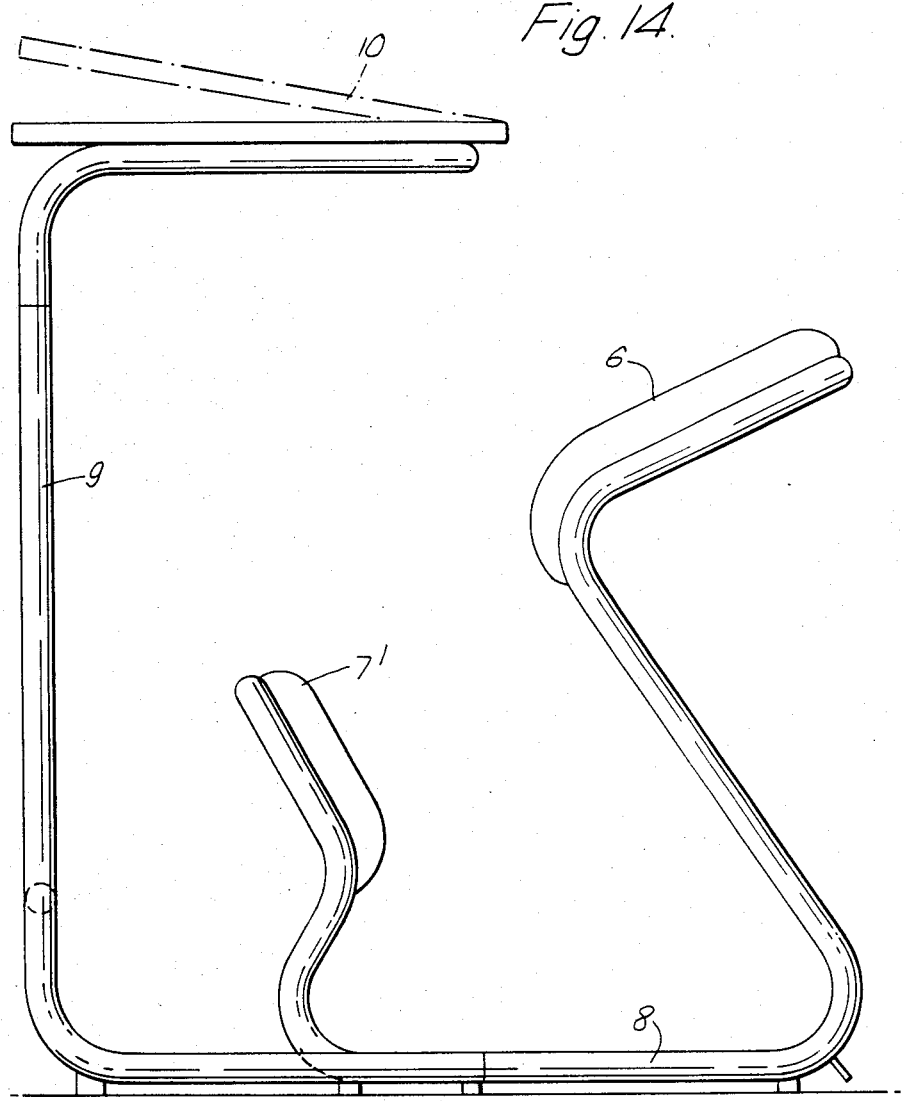
FIG. 14 depicts the embodiment of FIG. 13 with an attached desk plate.

In FIG. 14 the shin support 7' is substantially flat. The frame 8 is connected to a desk frame 9 supporting a desk plate 10.

Figure 15:
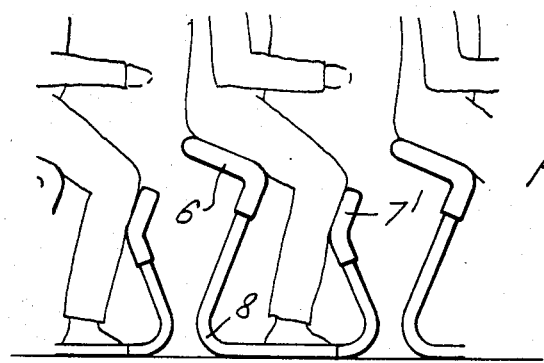
FIGS. 15 and 16 depict a further variant of the embodiment in FIGS. 11 and 12 in side and perspective views, respectively.
Figure 16:
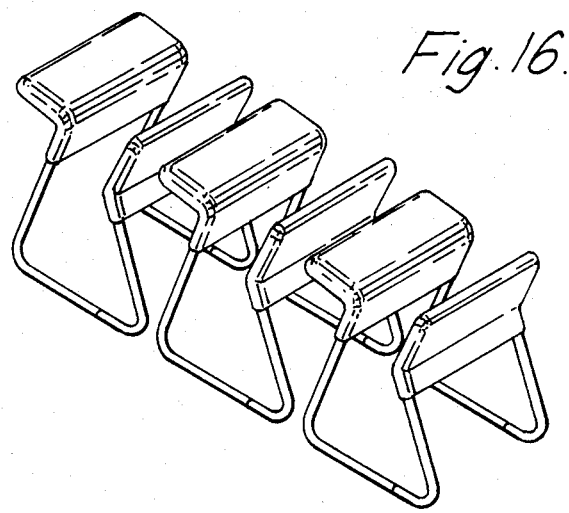
Figure 17:
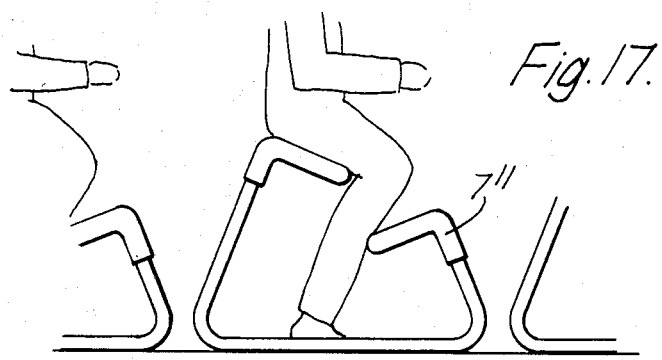
FIG. 17 is a modification of the embodiment of FIG. 15.

FIGS. 15 to 17 are in fact substantially the embodiment of FIG. 14 without a desk. As seen from FIG. 17, the shin support 7" has a somewhat L-shaped configuration.

Figure 23:
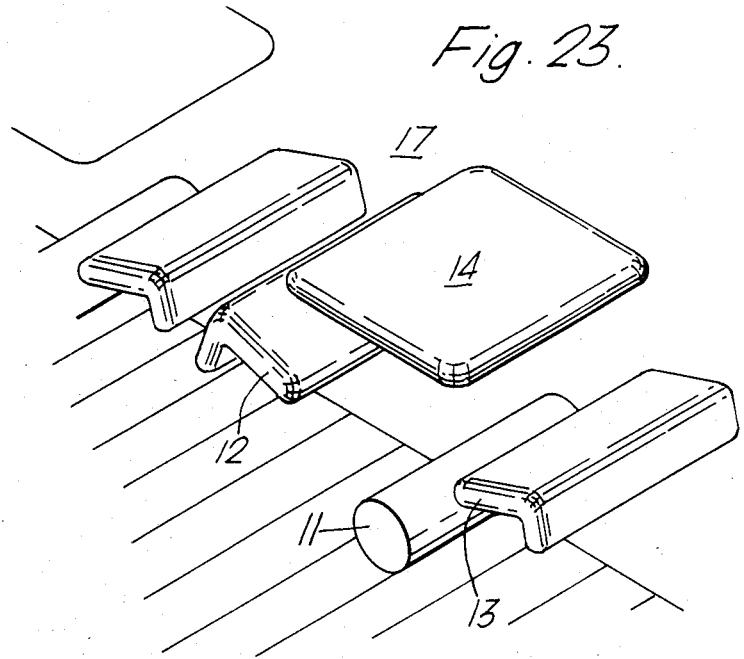

FIGS. 20–23 are further applications of the present invention. There is used a common shin cushion 11, two seats 12 and 13 on either side of said shin cushion and in opposed relationship, and finally there is a common table member 14. The elements are either fixedly attached to common frame members 15, 16 or to a wall 17 (FIG. 23). As will appear from FIG. 22, back rests 17, 18 may be provided as an optional choice. These embodiments find application e.g. in snack bars and restaurants.

Figure 18:
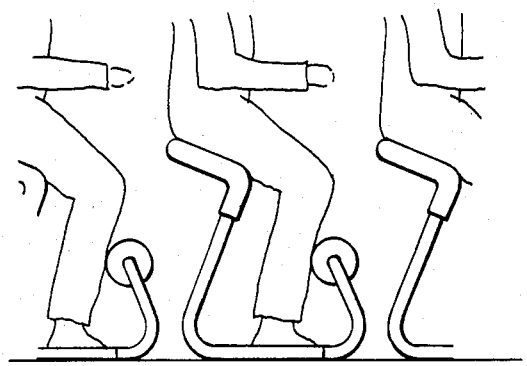
FIGS. 18 and 19 are side and perspective views respectively, of an application of the embodiment in FIG. 13.
Figure 19:
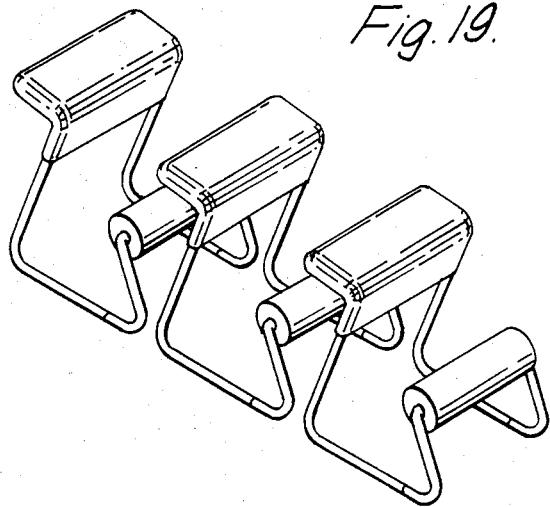
Figure 20:
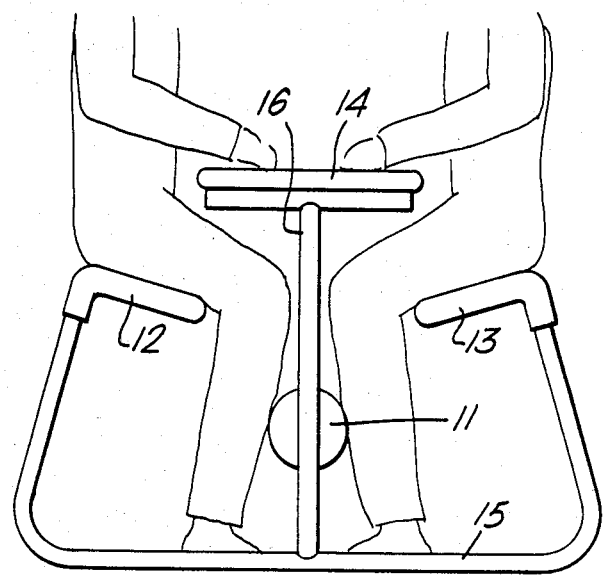
FIGS. 20 and 21 are side and perspective views respectively of two sitting devices with a common table and a common calf cushion, said devices being in a front to front relationship.
Figure 21:
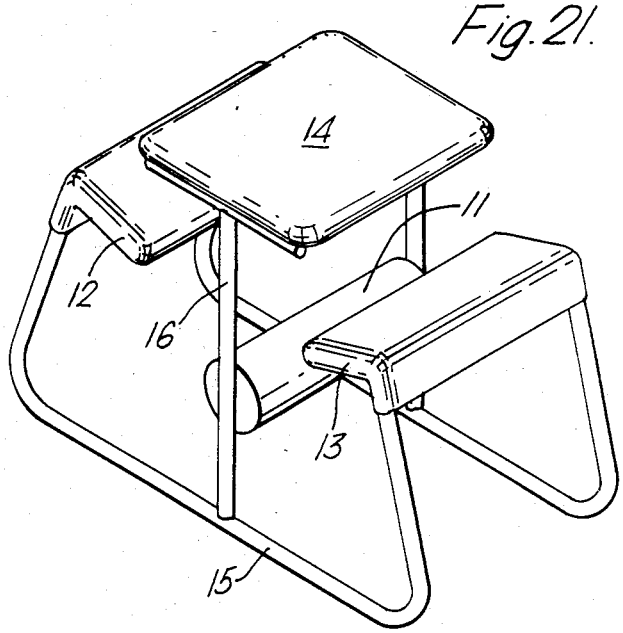
Figure 22:
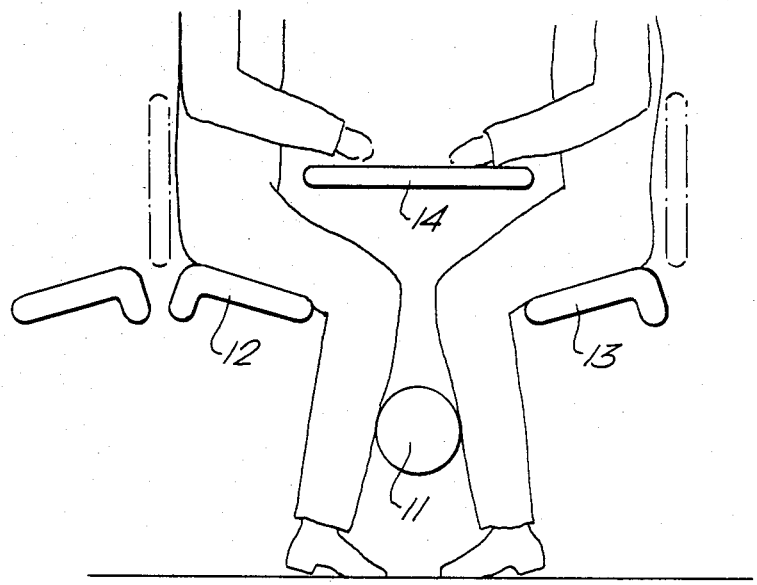
FIGS. 22 and 23 are a modification of the embodiment in FIGS. 20 and 21 with all the functional elements attached to a wall.
Figure 24:
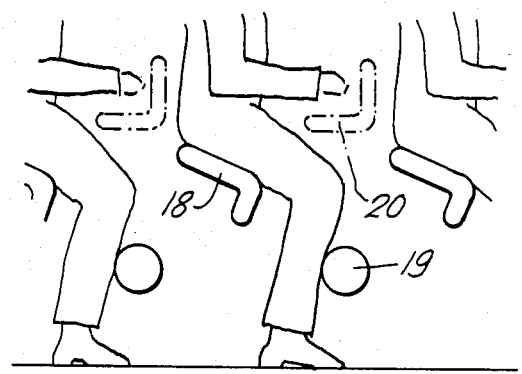
FIGS. 24 and 25 are side and perspective views respectively of a modification of the embodiment in FIGS. 18 and 19 and intended for wall mounting of all functional elements, and the provision of an optional combined desk and back rest.
Figure 25:
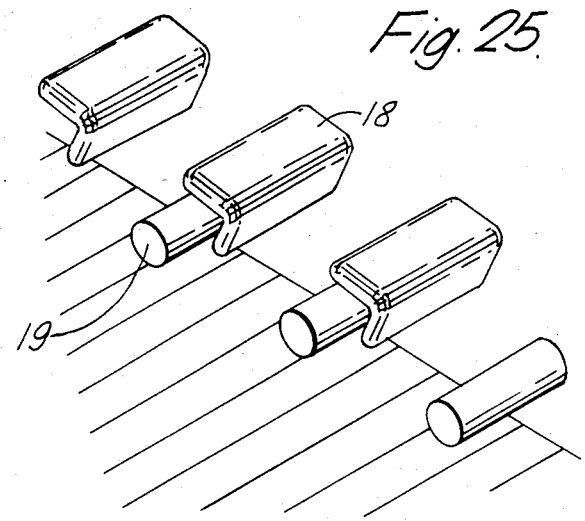

FIGS. 24 and 25 are variants of the embodiments in FIGS. 18 and 19, and the seat 18 may be, e.g. I-shaped, the shin cushion cylindrically shaped and there may optionally be arranged a combined desk and back rest member 20, substantially as shown in the drawing.

What we claim is:

1. A sitting device for use by at least first and second occupants sitting one behind the other, and facing forward comprising:

at least two identical integral and generally inverted L-shaped units supported in spaced-apart positions fixed relative to each other and disposed one behind the other with free space between them, each unit including first and second supporting faces corresponding to an upper generally horizontal leg of the inverted L-shape and the generally vertical leg thereof, respectively;

a posterior support for the first occupant being formed by the first supporting face of one unit and the second supporting face of the same unit forming a shin support for the second occupant seated on the other unit behind the first occupant, the first supporting face of the other unit forming a posterior support for the second occupant; and the first supporting face of each unit being in the form of a substantially unobstructed inclined surface extending across the unit, whereby the occupants may adjust their position on the first supporting faces so as to engage the second supporting faces with their shins regardless of variations in the lengths of the upper legs of different occupants.

2. A device according to claim 1, wherein the supporting faces are made of padded cushions.

3. A device according to claim 2, wherein the padded cushions have one of a cylindrical, oval or rectangular form.

4. A device according to claim 1, wherein the first supporting face forming the generally horizontal leg of each unit comprises a forwardly inclined seat cushion and the second supporting face forming the generally vertical leg of each unit comprises a shin cushion forming a mutual angle of at least 90° with the seat cushion.

5. A device as claimed in claim 1, wherein each unit is mounted solely by a vertical member.

6. A device as claimed in claim 5, wherein said unit is mounted such that the inner side of the generally vertical leg of the L forms the support for the shin of said one occupant.

7. A device as claimed in claim 5, wherein the unit is mounted such that the outer side of the generally vertical leg of the L forms the support for the shin of said one occupant.

8. A device as claimed in claim 1, wherein each unit further comprises mounting means attached to said generally vertical leg of said L-shaped member and adapted to mount each unit to a horizontal member.

9. A device as claimed in claim 8, wherein the unit is mounted such that the inner side of the vertical leg of the L forms the support for the shin of said one occupant.

10. A device as claimed in claim 8, wherein the unit is mounted such that the outer side of the generally vertical leg of the L forms the support for the shin of said one occupant.

11. A device as claimed in claim 8, wherein said mounting means comprises two spaced-apart members connected between opposite sides of the generally vertical leg and the horizontal member, which members permit the feet of the occupant to the rear of a said unit to pass therethrough.

* * * * *